United States Patent [19]

Wilson et al.

[11] Patent Number: 5,101,444
[45] Date of Patent: Mar. 31, 1992

[54] METHOD AND APPARATUS FOR HIGH SPEED OBJECT LOCATION

[75] Inventors: David H. Wilson, Nashua; Jake Richter, Londonderry, both of N.H.

[73] Assignee: Panacea, Inc., Londonderry, N.H.

[21] Appl. No.: 525,966

[22] Filed: May 18, 1990

[51] Int. Cl.$^5$ .............................................. G06K 9/20
[52] U.S. Cl. ............................. 382/48; 382/9; 382/10; 382/25
[58] Field of Search ............... 382/48, 9, 18, 10, 25, 382/27, 57; 358/401, 262.1, 426

[56] References Cited

U.S. PATENT DOCUMENTS

| | | | |
|---|---|---|---|
| 3,243,776 | 3/1960 | Abbott, Jr. et al. | 382/48 |
| 3,992,697 | 11/1970 | Kroh et al. | 382/25 |
| 4,377,803 | 3/1983 | Lotspiech et al. | 382/9 |
| 4,633,502 | 12/1986 | Namba | 382/48 |

*Primary Examiner*—Michael Razavi
*Attorney, Agent, or Firm*—Stephen G. Matzuk

[57] ABSTRACT

A method and apparatus for rapidly locating a desired object in a bit-mapped or vector display listed object space, wherein additional information is appended to or stored with the object information. This additional information relates to the relative coordinate position of that object or object element within a larger, more coarsely defined object space grid, such as an 8×8 grid. The apparatus and method of the present invention reduces the processing time necessary to locate the desired object within the object space by comparing the object and display area information relative to the grid for rapid preliminary acceptance or rejection prior to further detail search for the object or object elements. Thus, if no coincidence is found between the elements of the grid having at least a portion of the desired object and a second set of a grid elements corresponding to the desired display area, then the object is not located in the display area and further search in the corresponding grid portion of the object area is avoided. Similarly, signals relating cumulative object grid information are stored in linked memory lists, wherein comparisons between the display area grid information and the cumulative grid information contained in the linked display lists memory will eliminate the need to search that portion of memory should there be no coincidence, thereby enhancing the speed of object search.

16 Claims, 3 Drawing Sheets

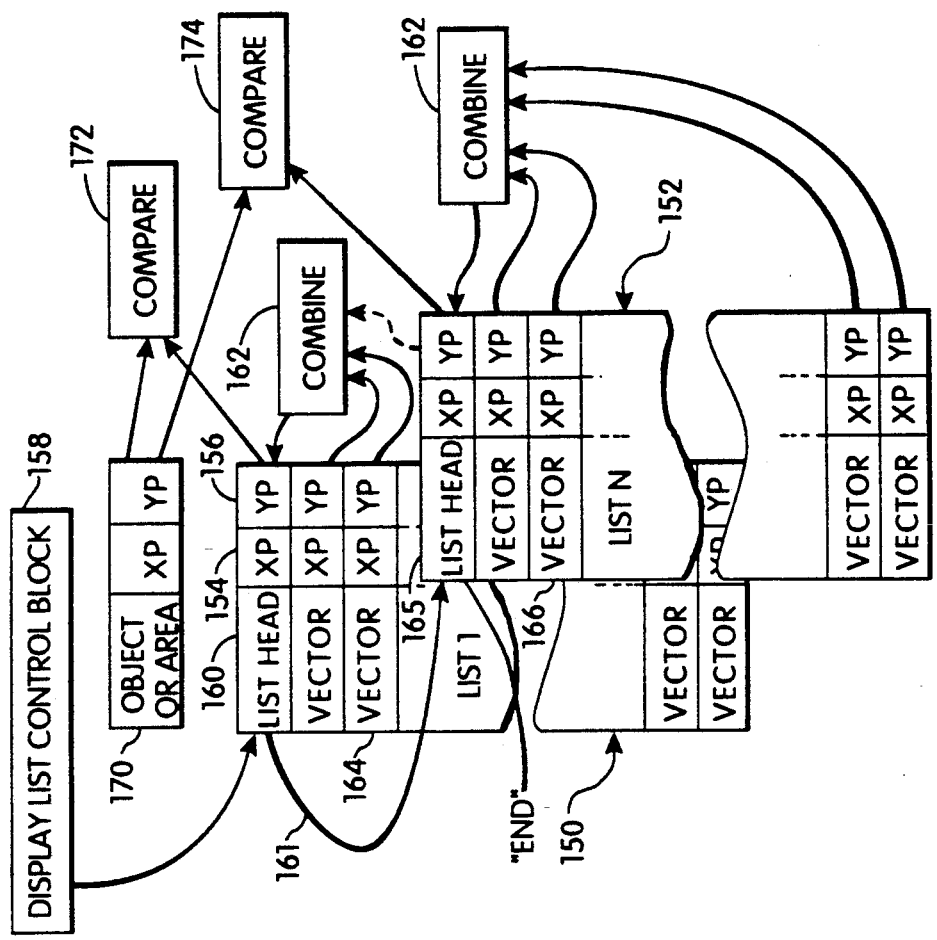
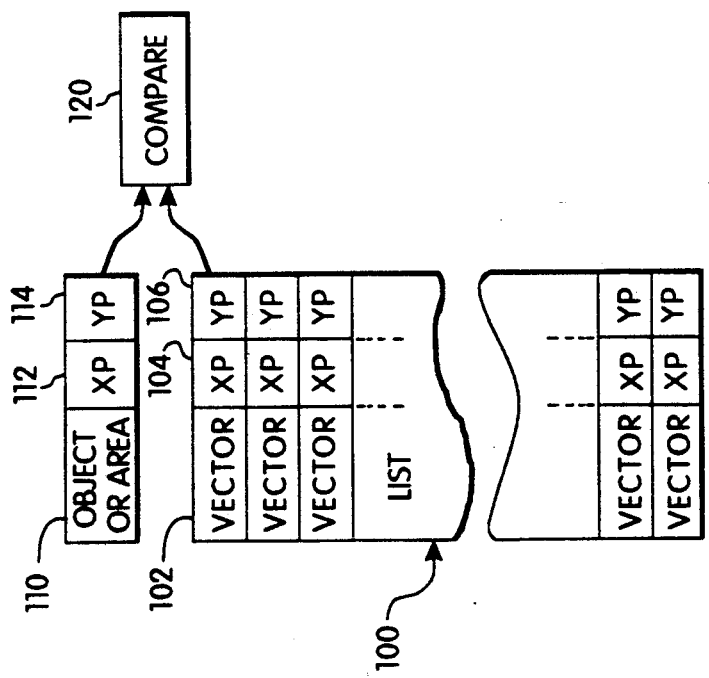
Fig. 4
Fig. 3

METHOD AND APPARATUS FOR HIGH SPEED OBJECT LOCATION

FIELD OF THE INVENTION

The present invention relates to bit-mapped and vector list graphic display systems, and in particular to display list drivers for use with computer aided design (CAD) systems, including corresponding bit-mapped or vector driven display devices which provide images and require processing thereon.

BACKGROUND OF THE INVENTIONS

Graphic systems which operate on generalized computer platforms present graphic-related signals to peripheral devices such as cathode ray tube (CRT) display devices, printer/plotters, typically modularize the system software, wherein the basic graphic system communicates to one or more peripheral graphics devices through selected graphic device drivers, and may incude a plurality of drivers each customized for the particular peripheral device.

The display drivers access the stored image, either in bit-mapped format or vector display format and present to the peripheral device a particular subset of the entire object space. Although the entire object space may contain a plurality of object images, a particular area of interest may contain a small portion of the total number of objects present in the entire object space, wherein the display of the area of interest requires only the object(s) within the area of interest to be displayed, the remaining objects being omitted from the display.

While analogous processes for specifying an object in bit-mapped display systems, an object in a vector display typically is composed of a plurality of line drawing vectors, wherein a begin and end point are specified. A complete display of all edges and/or surfaces includes a list of the vectors. Present vector-driven display devices require a list of vectors (vector display list) which is stored in a memory space sufficient in size to contain the entire image stored in the entire object space, from which the objects displayed in a selected area of interest are selected. Typically, however, the object-related vectors are not organized or identified according to a format which can be readily identified by the display driver, or which can facilitate rapid object identification or detection, requiring the display driver to search the entire display list and provide individual point comparisons to recover the object(s) within the object space, imposing a speed penalty in the display of image within the area of interest.

Furthermore, the problem is exacerbated when element deletion is implemented by overwriting the image with an identical blank or black image, providing a redundant and complemetary image vectors, both of which must be identified to provide the correct current image. Thus, previous display drivers have required a time consuming vector-by-vector comparison of the entire display list to determine which vectors or objects will be displayed prior to the actual display on selected peripheral device. Alternately, annoying flicker is created during display as deleted objects first appear and become overwritten by blank or black vectors, which are simply "displayed" along with the visible vectors and objects to be deleted. Moreover, such deleted vectors or objects cause holes to appear in other, overlapping or overlapped objects.

SUMMARY OF THE INVENTION

The method and apparatus according to the present invention provides rapid location of objects and constituent vectors displayed within a selected area of interest by dividing the N-dimensionsal object space into subportions in each dimension providing an N-dimensional grid of a selected number of elements, e.g. an $8 \times 8$ two dimensional grid. If an element, object or area of interest includes a particular grid region, each coordinate (X or Y) includes a corresponding logical indication of the presence of the image element. The presence or absence of the element, object or area of interest is noted for all grid portions, and logically combined (e.g. logical OR) along each coordinate axis. Thus, a two dimensional $8 \times 8$ grid provides an 8-bit binary projection for each of the X and Y coordinate axes. These X and Y projections are stored, juxtaposed or otherwise related to the element, object or area of interest in the appropriate adjacent memory locations. According to the present invention, rapid determination of the presence of an element or object in an area of interest is provided by comparison of the object or element vector projections with that of the area of interest, allowing the grid portions and corresponding memory list elements to be omitted from further search should no correspondence or coincidence be detected. Further search and image processing is more rapidly provided to the remaining grid portions for which coincidence is noted.

Further embodiments of the present invention provide for the rapid recovery of the location of constituent objects contained within a larger composite object or entity wherein the above discussed multi-dimensional (e.g. X and Y) projections of each of the constituent objects or elements are logically combined and stored as the entity or composite object dimensional projection. Thus, an entity when detected, will be rapidly indicated via the composite projection. The dimensional grid locations where constituent objects or elements are contained, obviating further search of the memory or display list by detailed point comparisons.

A further embodiment of the present invention relates to a display list memory to be segmented into a plurality of lists joined together with linking data to form a linked display list. According to the present invention, each contiguous portion of the memory forming the linked display list contains a header memory X and Y projection containing the logical combination of the projection of the vectors contained in that list portion. Thus, a search for a particular object will be expedited by comparing the projection of that object or area of interest to the display list memory portion header, wherein the portion of the display list is searched only if coincidence of projections is detected.

BRIEF DESCRIPTION OF THE DRAWING

These and further features of the present invention will be better understood by reading the following Detailed Desription of the Invention together with the Drawing, wherein:

FIG. 3 is a representation of the storage of vector projections with the vectors according to one embodiment of a further feature of the present invention;

FIG. 4 is a representation of the storage of display list cumulative projections according to one embodiment of a further feature of the present invention.

DETAILED DESCRIPTION OF THE PRESENT INVENTION

Figure 1:
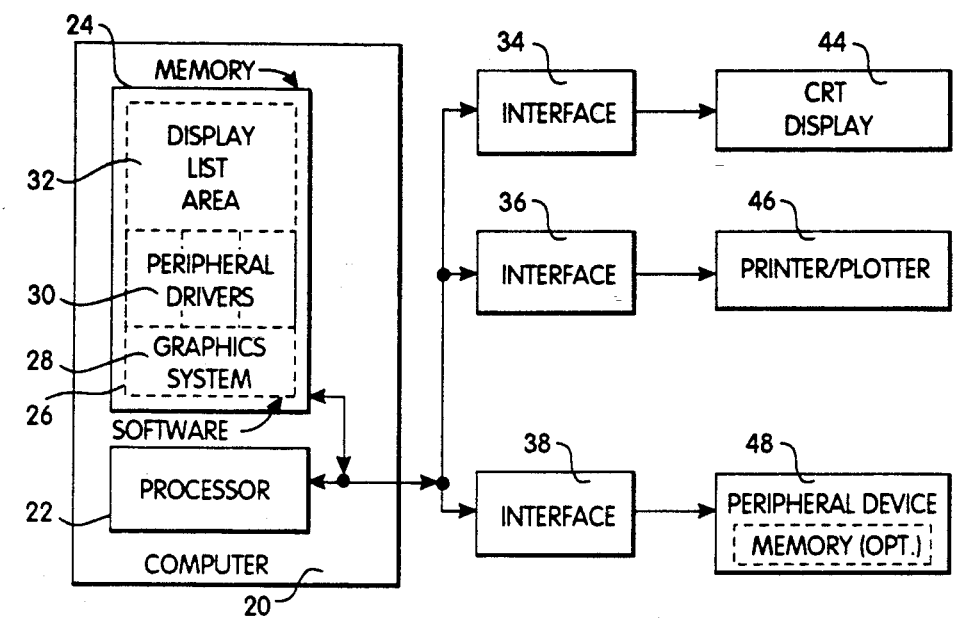
FIG. 1 is a block diagram of one embodiment of the present invention in the context of a typical graphics system.

A typical graphics system is shown in FIG. 1, including a general or special purpose computer 20, which includes a processor 22, memory 24, and various peripheral devices 44, 46 and 48 connected via appropriate interface hardware 34, 36 and 38 respectively. Moreover, the peripheral device, such as device may include memory or comprise a memory device operable according to the present invention.

The particular graphics system software 28, is included in the programmable software area of the memory 24, defining the protion of memory available for explicit image information (e.g. vectors). The software 26 further includes generic and/or customized peripheral drivers 30 as necessary to provide data in the proper format to the peripheral device interfaces and according to the processing performed by the processor 22. The object locator according to one embodiment of the present invention is located within one or more of the display drivers, 30.

Figure 2:
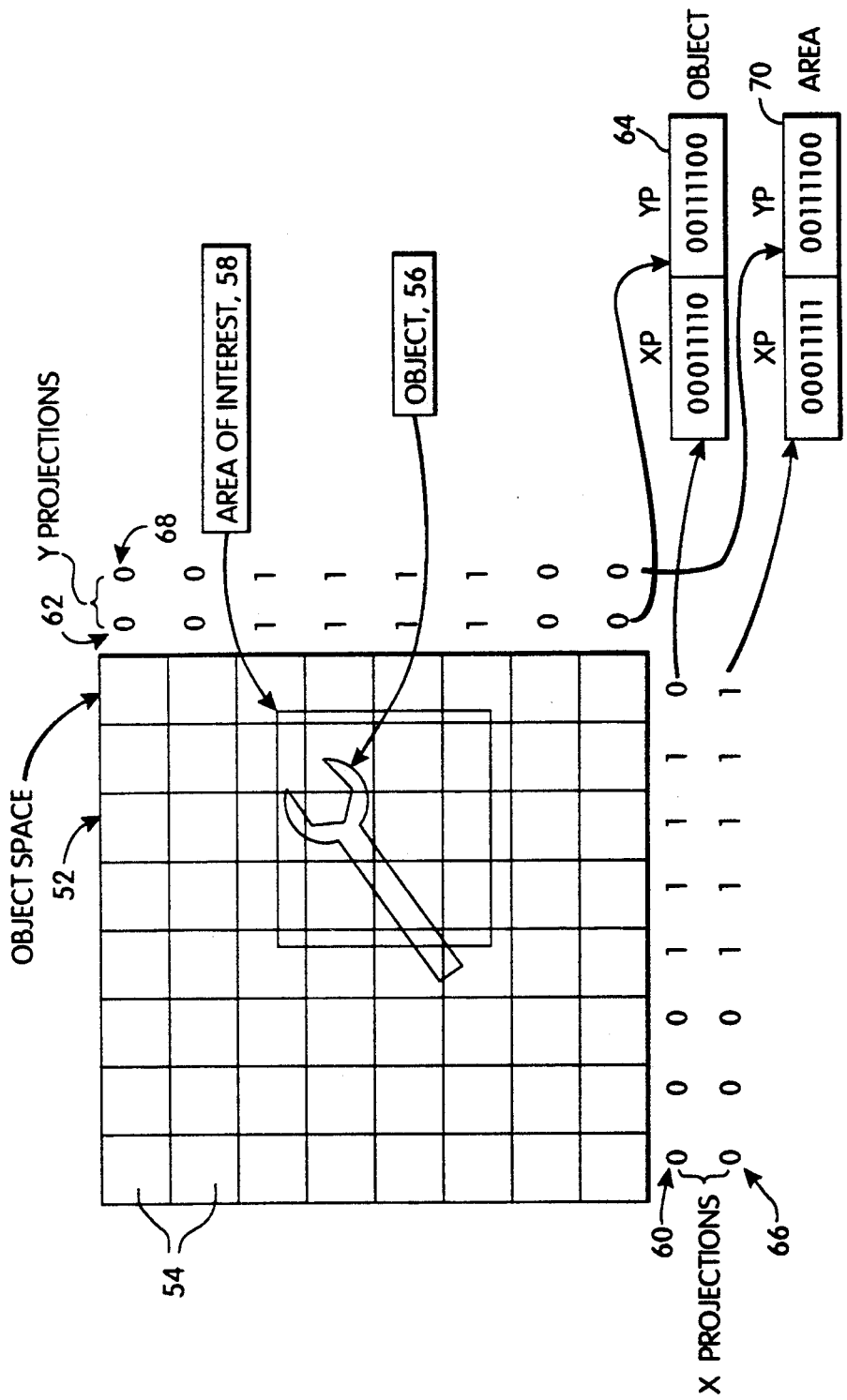
FIG. 2 is a representation of terms used as applied to a two dimensional object space.

The preferred embodiment of the present invention as relating to a two dimensional object space 52, is shown in FIG. 2, wherein each dimension of the two dimensional object space 52 is divided into 8 sub-portions 54, forming 64 grid blocks or boxes. While the object space 52 may include two dimensions, there is no limit to the number of dimensions that are envisioned for the memory space. Similarly, the object space may contain a virtually unlimited number of objects, for which a single representative object 56 is shown. A specified area of interest 58 which relates to a sub-portion of the object space is displayed or plotted by the peripheral device 44 or 46 of FIG. 1, is also indicated in the object space 52. According to the present invention, when an object 56 or an area of interest 58 exists in a particular grid box, a logical data value is assigned indicating the presence of the object 56 or the area of interest 58. The projections are formed by logically combining all logical values for the grid boxes along the particular axis. For instance, if the object 56 is present in one or more boxes in a particular dimension, the location of the vector or object along each coordinate is provided by projections from a Boolean OR of the individual logical value of each grid box along each coordinate. For illustration purposes, the X and Y object projections 60 and 62, respectively, are indicated at the periphery of the object space 52 in FIG. 2. However, the individual binary values are disposed to provide 16 bit object projections 64. Similarly, the X and Y projections 66 and 68, respectively, of the area of interest 58 are also illustrated at the periphery of the object space and are combined to form the corresponding projection signal 70.

According to the present invention, the X and Y projections of each vector which is included in the object 56 are included in the dislay list 100, shown in FIG. 3, wherein the vector (V) information 102 is appended with an X (XP) and Y (YP) projection, 104 and 106 respectively. The presence of the constituent vectors 102 within a particular area or object 110 is rapidly determined according to the present invention by a logical comparison of the object or area of interest X and Y projections, 112 and 114 respectively, to the individual vector 102 X and Y projections 104 and 106, respectively, wherein the product of the comparison indicate the presence of the object or vector in the area of interest. If the object or vector is not present within the area of interest, further investigation including that particular vector is avoided. Thus for each object (typically a vector, polygon or single point), the presence of the object in a particular grid box is determined by examining the points whch define the object boundary present within the square, each dimensional column is logically combined to form the individual binary value and concatenated with adjacent elements to form the projection for that particular dimension, and is further concatenated with the bits or words of other dimensions, forming the total projection signal or data. In the particular embodiment shown, the presence of the object or vector within a grid box is indicated by a logical "1", and the projections are formed by a Boolean OR of all box data in that particular column or row. Alternate embodiments providing complementary logic is within the scope of the present invention as well as methods and apparatus operable with dimensions numbering other than 2, and divisions per dimension other than 8.

In order to accomodate smaller memory portions which necessitate the division of the display list 100 into smaller display list sub-portions 150, 152, as shown in FIG. 4, the smaller memory portions are linked 161 together to form a larger display list via header 160,165 vectors provided by display list control block 158 (part of graphic system software 28). Another feature of the present invention provides for the rapid elimination of selected one of linked display lists sub-portions by providing a cumulative list X and Y projections 154, 156 respectively, to be included with the list header information 160. According to the present invention, the list projections 154,156 are a logical combination 162 of all dimension projections of the individual vector projections 164, 166 contained within each list and provided by the sam logical combination process used to form the projection from the individual box of the grid as described above with regard to FIG. 2. Thus, the presence of an object or area 170 in the list 150 or 152 is rapidly determined by comparing 172 the first list projection 154, 156. Similarly, the presence of the object or area 170 can be determined with regard to the other list (152) by further comparisons 174 Thus according, large portions of memory can be rapidly eliminated from search when the desired object or area 170 is not present, thereby significantly enhancing the speed at which the object or area is displayed.

Having identified the presence of the vector, object or area according to the present invention, the further processing, such pan, zoom, deletion, color change, etc. and/or display of the object or portion thereof can be made by task specification software without incurring delay or searching the entire display list by skipping the vectors of non-visible objects.

Figure 5:
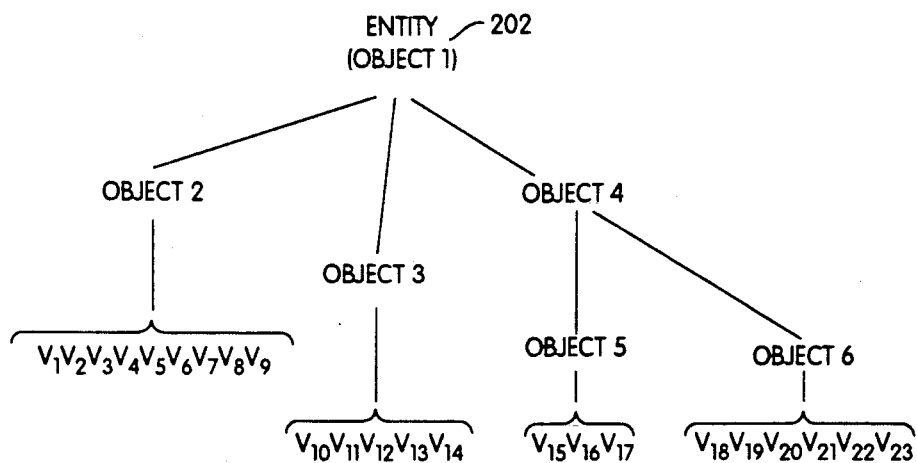
FIG. 5 is a representation of the construction of a composite object or entity in relation to a further feature of the present invention.

In a further embodiment, the method and apparatus of the present invention includes operation with a display system wherein object related information is provided, including the identification of the object and its constituent vectors, as well as composite objects or entities and constituent objects. According to this alternate embodiment, by first further interrogating the boxes being indicated by the vector projections as containing the initially searched element of a selected entity or composite object (identified for processing by reference to a constituent vector), the entire entity or composite object (and thereafter any constituent vector) is more rapidly located. Thus according to this feature of the present invention, having determined the location of the constituent element, the search for the largest entity is provided by propagating the individual vector projections upward to the larger composite objects or entities by logical combination to form a corresponding object or entity projection. For instance, the composition of the entity 202 shown in FIG. 5 is further described and located according to an appended projection comprising the bit-wise Boolean OR of all vectors contained in Object 2 in the display list at the beginning of Object 2, such as the list 150, 152 of FIG. 4. These projections would also be further propagated upward to be included in the projection of Object 1, as Object 1 contains Object 2. A new projection is created for Object 3 comprising the bit-wise Boolean OR of the projections of the constituent elements of that object. Thus, each object has a projection indicating which grid box(es) is(are) occupied by that particular object. For example, the creations of vector projections and the combinations of projections is shown by Table I:

TABLE I

Projection(Obj 2) = v1 OR v2 OR v3 OR v4 OR v5 OR v6 OR v7 OR v8 OR v9

Projection(Obj 3) = v10 OR v11 OR v12 OR v13 OR v14

Projection(Obj 5) = v15 OR v16 OR v17

Projection(Obj 6) = v18 OR v19 OR v20 OR v21 OR v22 OR v23

Projection(Obj 4) = (Proj.(Obj 5)) OR (Proj.(Obj 6))

Projection(Obj 1) = (Proj.(Obj 2)) OR (Proj.(Obj 3)) OR (Proj. (Obj 4))

Thus, if the system operating according to the present deletes or processes the image vectors contained in Object 5, but without identifying which object, the system will first search the projection of the deleted vector against the cumulative projection of Object 1. Finding a match (as Object 5 is contained within Object 1) the system then proceeds to the next object level to check the projection of Object 2. Assuming non-overlap of the objects, all of Object 2 may be advantageously skipped, thereby expediting the search for the desired object. Similarly, Object 3 can be omitted. Object 4, providing at least a single matching bit in its projection comparison, causes the system to compare Object 5's bits, and, upon finding a match, to search Object 5 thoroughly until the desired vector is identified and processed.

Also according to one embodiment of the present invention, the deletion or subsequent processing of objects, elements or vectors provides for further reduction in vector search time by next comparing the vector found at one or both ends of the vector previously identified and processed. The comparison is made between those contiguous vectors and the list of vectors to be processed. If such contiguous vectors are not to be processed (e.g. not deleted) the search begins at the next highest object level on which an object was previously found until all vectors therein are eliminated from further search by failing to provide projection coincidences. Thus according to the present invention, the search extends from the most deeply nested object (e.g. vector) upward, wherein comparisons to the projections of each more complex object is made, thereby indicating the presence or absence of the target vector. Upon a detection of projection coincidence, the initial target vector is deemed present, a search downward to the more elemental object elements is made, increasing the likelihood that the second vectors to be processed will be found with a minimum of searching. Thus according to the present invention, the search for objects and/or constituent elements is significantly expedited over the conventional serial complete display list search.

Alternate and further embodiments of the present invention relate to three-dimensional objects in a three-dimensional object space, each dimension having the projection according to the present invention, which projections may be compared to or combined with an incident light ray to rapidly provide a preliminary rejecton of objects outside the path of the light ray, rapidly speeding ray tracing system operations. Further modifications and substitutions of elements of the present invention made by one of ordinary skill in the art are included within the scope of the present invention, which is not to be limited except by the claims which follow.

What is claimed is:

1. A method of rapid object location within an area of interest in a multidimensional object space having a finite spatial resolution, comprising the steps of:

defining a plurality of regions in at least one dimension of said multidimensional space, said regions being larger than the spatial resolution of said object space;

providing a projection for said object in each dimension of said multidimensional object space, wherein said projection provides an indication of the presence of at least a portion of said object in each said region;

defining said area of interest comprising at least one of said regions in each said dimension;

providing a projection of said area of interest in each said dimension, wherein said projection provides an indication of the presence of at least a portion of said area of interest in each said region;

logically combining said projection of said object and said projection of said area of interest to provide an indication of the coincidence of the presence of at least a portion of said object in at least one of said plurality of regions, wherein the location of said object is provided by the logical combination of said projection of said object and said projection of said area of interest.

2. The Method of claim 1, further including the steps of:

providing a display rectangle comprising at least a portion of a region in each dimension of said multidimensional object space;

determining if said display rectangle includes at least a portion of said region having said coincidence; and displaying said object if a coincidence exists within said display rectangle.

3. The Method of claim 2, wherein said object is described by a display list comprising a plurality of display vectors, said method further including the step of:

storing said projection for said object with said display vectors.

4. The Method of claim 3, further comprising the steps of:
   providing a plurality of linked lists for providing said display list;
   providing for each linked list, a cumulative logical combination of said projections for said object;
   logically combining a selected one of said cumulative logical combination and a projection of an area of interest providing a list coincidence signal if at least a portion of said area of interest and said cumulative logical combination exists; and
   elimination from further search said linked lists corresponding to the cumulative logical combination providing no list coincidence signal produced as a result of said logical combination.

5. The Method of claim 3, further comprising the steps of:
   providing a plurality of linked lists providing said display list;
   providing for each linked list, a cumulative logical combination of said projections for said objects;
   providing a projection for a selected object;
   comparing said projection of said selected object with said cumulative logical combination of one of said linked lists and providing a coincidence signal if at least a portion of said logical projection and said cumulative logical combination is coincident; and
   eliminating from further search said one of said linked lists upon the absence of a corresponding coincidence signal.

6. Apparatus for providing rapid object location within an area of interest in a multidimension object space having a finite spatial resolution, comprising:
   means for defining a plurality of regions in at least one dimension of said multidimensional space, said regions being larger than the spatial resolution of said object space;
   means for providing a projection for said object in each dimension of said multidimensional object space, wherein
      said projection provides an indication of the presence of at least a portion of said object in each said region;
   means for defining said area of interest comprising at least one of said regions in each said dimension;
   means for providing a projection of said area of interest in each said dimension, wherein
      said projection provides an indication of the presence of at least a portion of said area of interest in each said region;
   means for logically combining said projection of said object and said projection of said area of interest to provide an indication of the coincidence of the presence of at least a portion of said object in at least one of said plurality of regions, wherein
   the location of said object is provided by the logical combination of said projection of said object and said projection of said area of interest.

7. The Apparatus of claim 6, further including:
   means for providing a display rectangle comprising at least a portion of a region in each dimension of said multidimensional object space;
   means for determining if said display rectangle includes at least a portion of said region having said coincidence; and
   means for displaying said object if a coincidence exists within said display rectangle.

8. The Apparatus of claim 7, wherein
   said object is described by a display list comprising a plurality of display vectors, said apparatus further including:
   means for storing said projection for said object with said display vectors.

9. The Apparatus of claim 8, further comprising:
   means for providing a plurality of linked lists for providing said display list;
   means for providing for each linked list, a cumulative logical combination of said projections for said object;
   means for logically combining a selected one of said cumulative logical combination and a projection of an area of interest providing a list coincidence signal if at least a portion of said area of interest and said cumulative logical combination exists; and
   means for eliminating from further search said linked lists corresponding to the cumulative logical combination providing no list coincidence signal produced as a result of said logical combination.

10. The Apparatus of claim 8, further comprising:
    means for providing a plurality of linked lists providing said display list;
    means for providing for each linked list, a cumulative logical combination of said projections for said objects;
    means for providing a projection for a selected object;
    means for comparing said projection of said selected object with said cumulative logical combination of one of said linked lists and providing a coincidence signal if at least a portion of said logical projection and said cumulative logical combination is coincident; and
    means for eliminating from further search said one of said linked lists upon the absence of a corresponding coincidence signal.

11. A method for identifying component vectors of a multidimensional object elements from among a plurality of listed vectors, comprising the steps of:
    generating a projection signal corresponding to a projection of regions from a logical combination of the constituent vectors of a selected object;
    storing said projection signal in a display list memory in association with said selected object in multidimensional object space;
    defining an area of interest including at least one region;
    generating an area of interest signal corresponding to said area of interest;
    logically comparing said area of interest signal with said projection signal;
    eliminating from further search said selected object if no coincidence is provided by said step of logical comparing detecting the coincidence of a selected object according to a coincidence of said area of interest signal with a projection signal of a first object; and
    generating a composite projections signal from the projection of a composite object.

12. The method of claim 11, wherein
    a composite object is formed from a plurality of selected objects, said method further comprising the step of:
    forming a composite projection signal of regions from the logical combination of projection from the constituent selected objects.

13. Apparatus for identifying component vectors of a multidimensional object elements from among a plurality of listed vectors, comprising:
   means for generating a projection signal corresponding to a projection from a logical combination of the constituent vectors of a selected object;
   means for storing said projection signal in a display list memory in association with said selected object in multidimensional object space;
   means for defining an area of interest including at least one region;
   means for generating an area of interest signal corresponding to said area of interest;
   means for logically comparing said area of interest signal with said projection signal;
   means for eliminating from further search said selected object if no coincidence is provided by said step of logical comparing means for detecting the coincidence of said area of interest with a selected object projection;
   means for detecting at least one constituent vector of said coincident selected object with constituent vectors of a composite object; and
   means for identifying regions of further coincident selected vectors from said composite projection.

14. The Apparatus of claim 13, wherein
   a composite object is formed from a plurality of selected objects, said apparatus further comprising:
   means for forming a composite projection of regions signal logical combination of projections from the constituent selected objects.

15. The Method of claim 11, further including the steps of:
   detecting the coincidence of said projection signal of said first object with said composite projection signal, wherein at least one non-coincident composite object constituent vector is identified among the constituent vectors of said composite object.

16. The Method of claim 1, further including the steps of:
   generating the projection signal of a second object;
   detecting the coincidence of said projection signal of said second object and said composite projection signal; and
   identifying second object constituent vectors from said projection signal of said second object.

* * * * *